US012623142B2

(12) United States Patent (10) Patent No.: US 12,623,142 B2
Liu (45) Date of Patent: May 12, 2026

(54) SHAFT JOYSTICK WITH LIGHT ADJUSTMENT CUSTOMIZATION FUNCTION

(71) Applicant: Shenzhen Qanba Technology Development Co., Ltd, Shenzhen (CN)

(72) Inventor: Kai Liu, Shenzhen (CN)

(73) Assignee: Shenzhen Qanba Technology Development Co., Ltd, Shenzhen (CN)

( * ) Notice: Subject to any disclaimer, the term of this patent is extended or adjusted under 35 U.S.C. 154(b) by 575 days.

(21) Appl. No.: 18/126,491

(22) Filed: Mar. 27, 2023

(65) Prior Publication Data

US 2023/0226441 A1    Jul. 20, 2023

(30) Foreign Application Priority Data

May 17, 2022    (CN) ......................... 202221184258.8

(51) Int. Cl.
| | |
|---|---|
| *A63F 13/24* | (2014.01) |
| *G05G 9/047* | (2006.01) |
| *H05B 47/105* | (2020.01) |
| *H05B 47/155* | (2020.01) |

(52) U.S. Cl.
CPC ............. *A63F 13/24* (2014.09); *G05G 9/047* (2013.01); *H05B 47/105* (2020.01); *H05B 47/155* (2020.01); *A63F 2300/1043* (2013.01)

(58) Field of Classification Search
CPC .. A63F 13/24; A63F 2300/1043; G05G 9/047
See application file for complete search history.

(56) References Cited

U.S. PATENT DOCUMENTS

| | | | | |
|---|---|---|---|---|
| 5,632,679 | A * | 5/1997 | Tremmel ........... | H03K 17/9645 |
| | | | | 463/36 |
| 6,402,616 | B1 * | 6/2002 | Ogata ...................... | A63F 13/23 |
| | | | | 345/170 |
| 8,795,077 | B1 * | 8/2014 | Musick, Jr. ........... | A63F 13/213 |
| | | | | 463/37 |
| 2001/0004608 | A1 * | 6/2001 | Cheng ................... | G05G 9/047 |
| | | | | 463/36 |
| 2003/0144752 | A1 | 7/2003 | Furukawa | |
| 2004/0095320 | A1 | 5/2004 | Furukawa | |
| 2004/0224768 | A1 * | 11/2004 | Hussaini ................. | A63F 13/24 |
| | | | | 463/37 |
| 2004/0266528 | A1 * | 12/2004 | Wang .................... | A63F 13/212 |
| | | | | 463/37 |
| 2006/0079328 | A1 * | 4/2006 | Wang ...................... | A63F 13/28 |
| | | | | 463/37 |
| 2007/0093291 | A1 * | 4/2007 | Hulvey ................. | A63F 13/843 |
| | | | | 463/36 |
| 2007/0218994 | A1 * | 9/2007 | Goto ....................... | G06F 3/033 |
| | | | | 463/36 |

(Continued)

*Primary Examiner* — David L Lewis
*Assistant Examiner* — Shauna-Kay Hall
(74) *Attorney, Agent, or Firm* — Hemisphere Law, PLLC

(57) ABSTRACT

A shaft joystick with a light adjustment customization function is provided, which relates to the technical field of game peripherals. By the adoption of the above technical solution, the shaft joystick is easy and convenient to operate, and users can change the illuminated display of the game buttons and the lever according to own preferences, which is conductive to enhancing the user experience of game players.

9 Claims, 5 Drawing Sheets

(56)                References Cited

U.S. PATENT DOCUMENTS

| 2009/0174657 | A1* | 7/2009 | Miyazaki | G06F 3/01 |
| | | | | 345/158 |
| 2009/0253509 | A1* | 10/2009 | Tripp | A63F 13/90 |
| | | | | 463/37 |
| 2012/0176315 | A1* | 7/2012 | Cordes | G06F 3/0234 |
| | | | | 345/161 |
| 2018/0321704 | A1 | 11/2018 | Sirohiwala et al. | |
| 2023/0218990 | A1* | 7/2023 | Liu | A63F 13/214 |
| | | | | 463/37 |

\* cited by examiner

1

A

1

SHAFT JOYSTICK WITH LIGHT ADJUSTMENT CUSTOMIZATION FUNCTION

TECHNICAL FIELD

The present disclosure relates to the technical field of game peripherals, specifically to a shaft joystick with a light adjustment customization function.

BACKGROUND

Shaft joystick is a common component of an electronic game console. By manipulating its buttons and lever, simulated characters on mobile phones, computers and other electronic devices can be controlled to achieve the purpose of playing a game.

With the population of games, people have increasingly high requirements for game experience. A luminescence function of a shaft joystick not only makes the shaft joystick more beautiful and enhances the game experience, but also enables users to see game buttons clearly in bad light. However, the luminescence function of the existing product is a factory set function. When in use, users cannot change the color of the buttons or turn on/off a certain button LED according to their own preferences, so improvement is urgently needed.

SUMMARY

The present disclosure aims to provide a shaft joystick with a light adjustment customization function for the defects and shortcomings in the prior art. The shaft joystick has a reasonable overall structure and is easy and convenient to operate, and users can change illuminated display of game buttons and a lever according to their own preferences, which is conductive to enhancing the user experience of game players.

In order to achieve the above objective, the technical solution adopted in the present disclosure is as follows: A shaft joystick with a light adjustment customization function includes a body, a lever and several game buttons; several first LED groups, several second LED groups and an LED group controller are arranged in the body; an outer surface of the body is provided with a light pattern selection button and an LED color selection button which are connected to the LED group controller; the first LED groups corresponding to positions of the game buttons are arranged inside the body and are triggered by the game buttons; the second LED groups corresponding to at least four orientations of the lever are arranged inside the body and are triggered by the lever executing the orientations; the light pattern selection button is used for switching the first LED groups and the second LED groups to a light change pattern; and the LED color selection button is used for adjusting in a customizable manner the colors or on/off of the first LED groups and the second LED groups in the light change pattern.

In a further setting of the present disclosure, the light pattern selection button is also used for switching the first LED groups and the second LED groups to any one of a weak light pattern, a strong light pattern, a breathing LED pattern, a marquee pattern and at least one customized light pattern.

In a further setting of the present disclosure, the LED color selection button and the light pattern selection button are both arranged on one side of the body far from a user, and the LED color selection button is an adjustment roller.

In a further setting of the present disclosure, a power-off memorization module electrically connected to the light pattern selection button is arranged in the body.

In a further setting of the present disclosure, the light pattern selection button and the LED color selection button are simultaneously triggered to reset the current customized light pattern.

In a further setting of the present disclosure, one end of the lever is detachably assembled in the body through the bolt; and an unlocking end of the body close to the bolt is movably provided with an unlocking hole cap for locking or unlocking the bolt.

In a further setting of the present disclosure, the unlocking hole cap includes a rotary hole cap piece and a hardware unlocking member; a mounting slot is formed in an unlocking end of the body close to the bolt; at least one open position for picking and placing the unlocking hole cap and one close position for preventing the unlocking hole cap from falling off are arranged on the mounting slot.

In a further setting of the present disclosure, a storage cavity is arranged on one side of the body; and the storage cavity is used for storing a USB data wire and/or the lever.

By the adoption of the above technical solution, the present disclosure has the following beneficial effects:

1. In the present disclosure, the first LED groups are arranged at the positions of the several game buttons, and the second LED groups are arranged on the several orientations of the levers, so that when in use, a user can customize a light adjustment instruction by means of the light pattern selection button and the LED color selection button, and the LED group controller controls the first LED groups and the second LED groups to be correspondingly changed. The overall operation is simple and convenient. The user can change the illuminated display of the game buttons and the lever according to own preferences, which is conductive to enhancing the user experience of game players.

2. In the present disclosure, by means of arranging the built-in unlocking hole cap on the body, a removal tool for the lever can be obtained directly from the body to lock or unlock the bolt to mount and remove the lever. Furthermore, the removed lever and the USB data wire can be stored in the storage cavity, which effectively avoids loss of parts. The storage-facilitated shaft joystick has a reasonable overall structure, does not require extra removal and storage tools, and has the advantages of practicability, quickness and convenience in removal and storage.

BRIEF DESCRIPTION OF THE DRAWINGS

In order to describe the embodiments of the present disclosure or the technical solutions in the prior art more clearly, drawings required to be used in the embodiments or the illustration of the existing art will be briefly introduced below. Obviously, the drawings in the illustration below are merely some embodiments of the present disclosure. Those ordinarily skilled in the art also can acquire other drawings according to the provided drawings without doing creative work.

NUMERALS IN THE DRAWINGS

Figure 1:
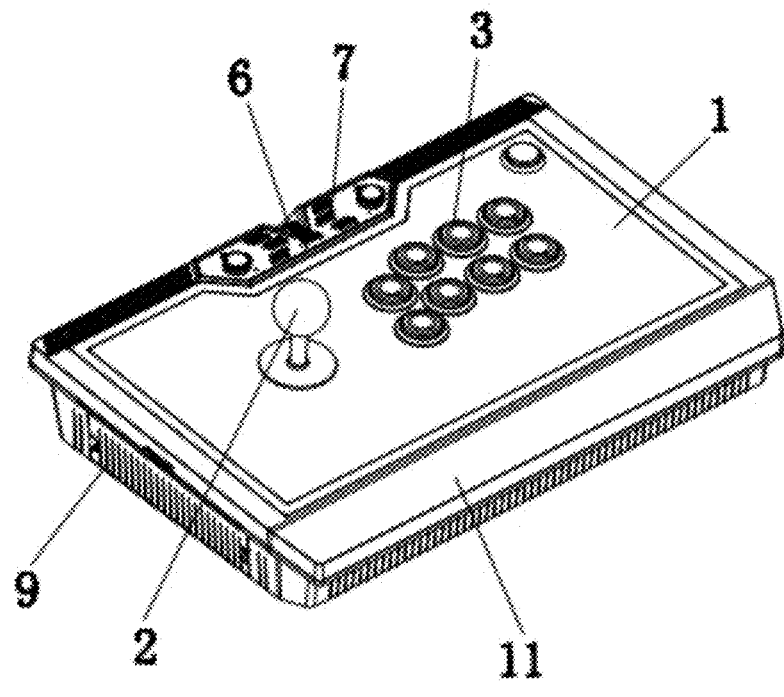
FIG. 1 is a schematic structural diagram of this embodiment.

1: body; 2: lever; 3: game button; 31: first LED group; 21: second LED group; 4: LED group controller; 5: light pattern selection button; 6: LED color selection button; 7: bolt; 8: unlocking hole cap; 81: rotary hole cap piece; 82: hardware unlocking member; 83: mounting slot; 84: open position; 85: close position; 9: storage cavity; 10: antiskid pad; and 11: hand support portion.

DETAILED DESCRIPTION OF THE EMBODIMENTS

The present disclosure is further described in detail below in combination with accompanying drawings.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

In the prior art, main structural components of a shaft joystick include a body, a lever, a plurality of elastic trigger buttons (silicone buttons or Dome buttons) and s trigger printed circuit board (PCB). The trigger buttons are mounted in a fixed support on the body, and the trigger PCB is mounted in the body and located below the fixed support. By means of manipulating and pressing a certain trigger button, the trigger button is compressed and moves toward the trigger PCB to contact the trigger PCB to trigger a corresponding function. The lever is movably connected with the body. When triggered by a user, the lever will move relative to a lever support to generate a corresponding lever operation signal.

This embodiment relates to a shaft joystick with a light adjustment customization function, as shown in FIG. 1 to FIG. 5, including a body 1, a lever 2 and several game buttons 3. Several first LED groups 31, several second LED groups 21 and an LED group controller 4 are arranged inside the body 1. An outer surface of the body 1 is provided with a light pattern selection button 5 and an LED color selection button 6 which are connected to the LED group controller 4. Positions of the first LED groups 31 corresponding to the game buttons 3 are arranged inside the body 1 and are triggered by the game buttons 3. At least four orientations of the second LED groups 21 corresponding to the lever 2 are arranged inside the body 1 and are triggered by the lever 2 executing the orientations. The light pattern selection button 5 is used for switching the first LED groups 31 and the second LED groups 21 to a light change pattern. The LED color selection button 6 is used for adjusting in a customizable manner the colors or on/off of the several first LED groups 31 and the several second LED groups 21 in the light change pattern.

When in use, a user can customize a light adjustment instruction by means of the light pattern selection button 5 and the LED color selection button 6, and the LED group controller 4 controls the first LED groups 31 and the second LED groups 21 to be correspondingly changed. The overall operation is simple and convenient. The user can change the illuminated display of the game buttons 3 and the lever 2 according to own preferences, which is conductive to enhancing the user experience of game players.

In this embodiment, the light pattern selection button 5 is also used for switching the first LED groups 31 and the second LED groups 21 to any one of a weak light pattern, a strong light pattern, a breathing LED pattern, a marquee pattern and at least one customized light pattern. Thus, the user can switch different light patterns according to different game types, game environments and game habits, and the operation is easy and convenient.

In order to further adapt to various customized light patterns, the light pattern selection button 5 and the LED color selection button 6 are simultaneously triggered to reset the current customized light pattern. As shown in FIG. 1, the LED color selection button 6 and the light pattern selection button 5 are both arranged on one side of the body 1 away from the user, so that mistouch by the user in an operating process can be avoided, without affecting the game experience. The LED color selection button 6 is an adjustment roller. During switching of LED colors, only the roller is rolled. This operation conforms to the human engineering, and is convenient and reasonable. Further, the first LED groups 31 and the second LED groups 21 both include at least one kind of red-light diodes HR, green-light diodes HG, blue-light diodes HB and white-light diodes HB.

In order to further improve the operation convenience of the shaft joystick, a power-off memorization module electrically connected to the light pattern selection button 5 is arranged in the body 1. That is, after power off and restart, the system will select the last light pattern by default, so as to enhance the user experience.

Figure 2:
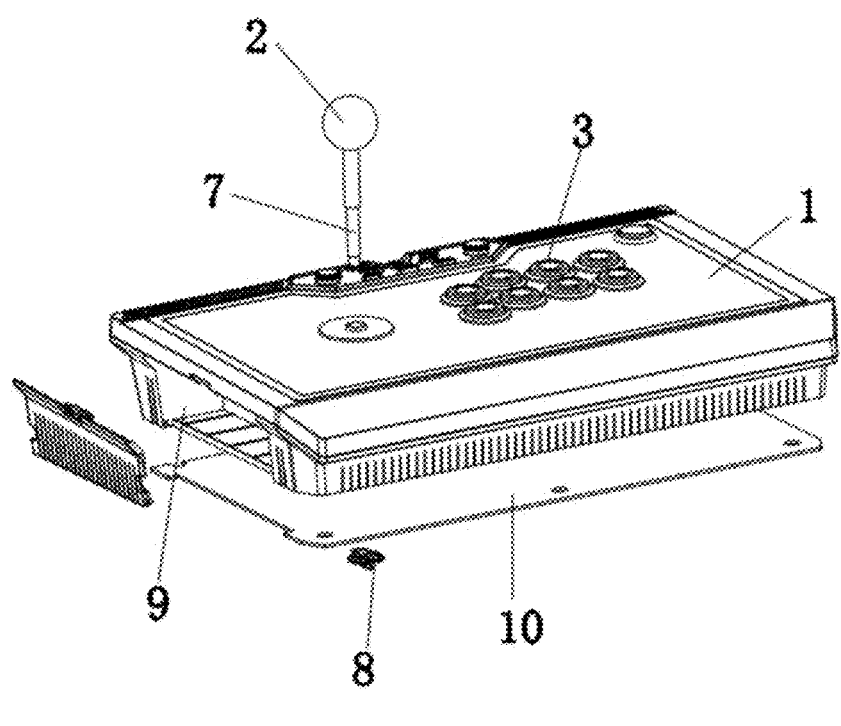
FIG. 2 is a schematic exploded diagram in this embodiment.
Figure 3:
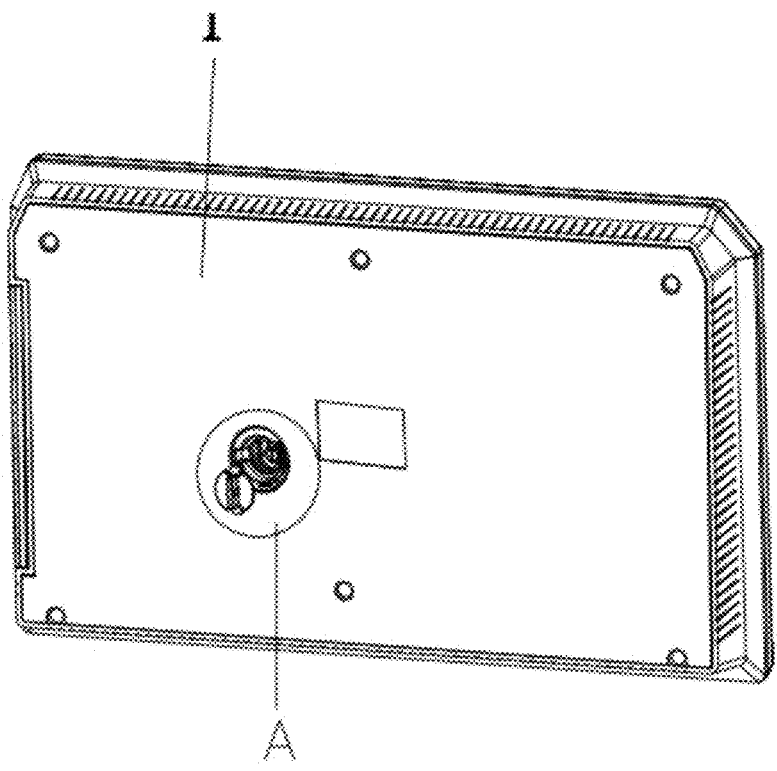
FIG. 3 is another schematic structural diagram in this embodiment.
Figure 4:
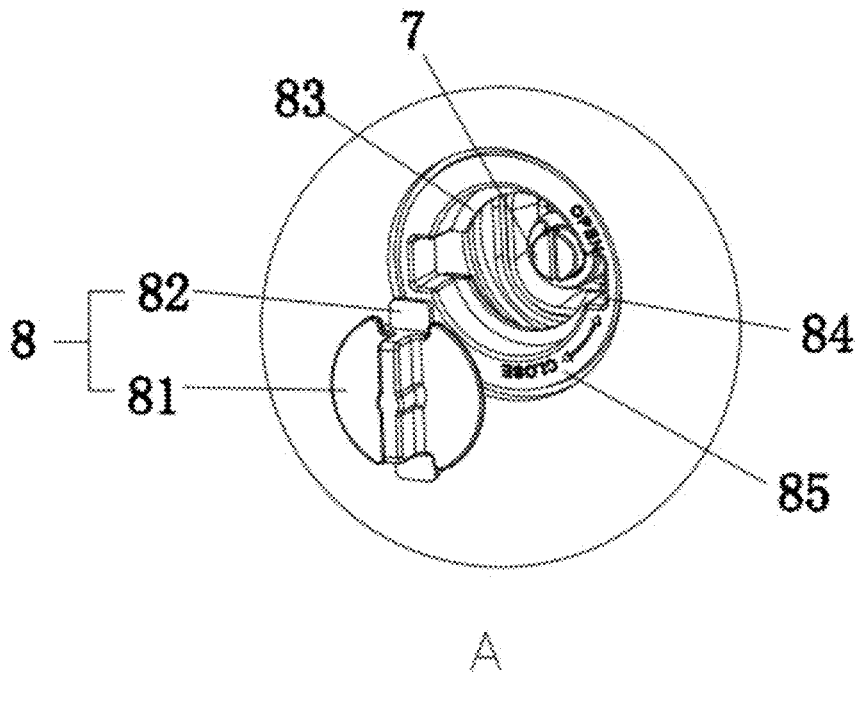
FIG. 4 is a schematic enlarged diagram of the part A in FIG. 3.
Figure 5:
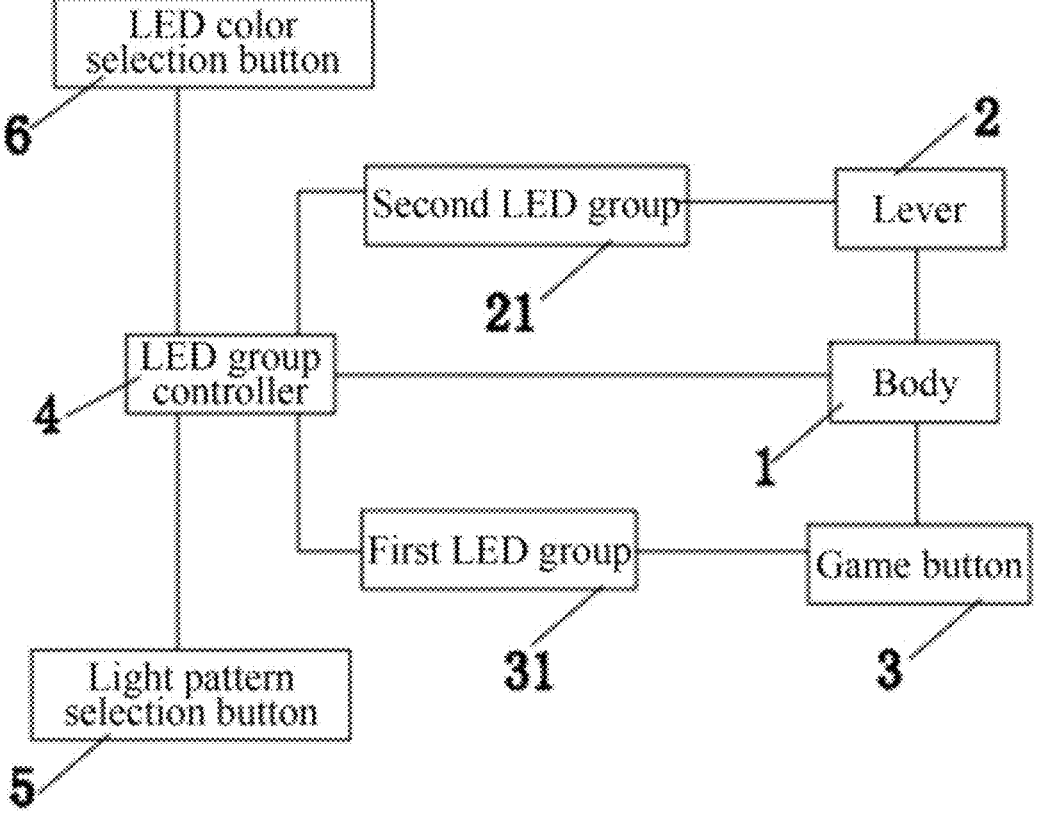
FIG. 5 is a schematic diagram of circuit connection in this embodiment.

As shown in FIG. 2 to FIG. 4, in the shaft joystick in this embodiment, one end of the lever 2 is detachably assembled in the body 1 through the bolt 7. An unlocking end of the body 1 close to the bolt 7 is movably provided with an unlocking hole cap 8 for locking or unlocking the bolt 7. By means of arranging the built-in unlocking hole cap 8 on the body 1, a removal tool for the lever 2 can be obtained directly from the body 1 to lock or unlock the bolt 7 to mount and remove the lever 2. The shaft joystick with a light adjustment customization function has a reasonable overall structure, does not require extra removal and storage tools, and has the advantages of practicability, quickness and convenience in removal and storage.

As shown in FIG. 2 to FIG. 4, the unlocking hole cap 8 includes a rotary hole cap piece 81 and a hardware unlocking member 82. Specifically, the bolt 7 in this embodiment is a slot type bolt 7, so the hardware unlocking member 82 on the unlocking hole cap 8 is slot type. The rotary hole cap piece 81 is provided with a holding portion for user operation, and the slot type hardware unlocking member 82 is symmetrically arranged on the rotary hole cap piece 81. A mounting slot 83 is formed in an unlocking end of the body 1 close to the bolt 7. At least one open position 84 for picking and placing the unlocking hole cap 8 and one close position 85 for preventing the unlocking hole cap 88 from falling off are arranged on the mounting slot 83.

To remove the lever 2, the rotary hole cap piece 81 is held and rotated a certain angle to the left/right until the hardware unlocking member 82 is aligned with the open position 84 of the mounting slot 83. The entire unlocking hole cap is then taken down, so that the unlocking end of the bolt 7 is exposed in the mounting slot 83. The user can unscrew the bolt 7 using the hardware unlocking member 82 to remove the lever 2. After the removal is completed, the hardware unlocking member 82 is aligned with the open position 84 and is inserted into the mounting slot 83; the rotary hole cap piece 81 is operated and rotated a certain angle to the close position 85 to complete mounting of the unlocking hole cap 8.

As shown in FIG. 1 and FIG. 2, in this embodiment, a hand support portion 11 is arranged on one side of the body 1 close to the user, and a bottom of the body 1 is provided with a full surface antiskid pad 10. When in use, the bottom antiskid pad 10 contacts a bearing surface to play a good antiskid role, making the shaft joystick not easy to move. The hand support portion 11 is conductive to uniform supporting of user's hands, thus improving the operation convenience of the hands. A storage cavity 9 is also arranged on one side of the body 1. The storage cavity 9 is also used for storing a USB data wire and/or the removed lever 2, thereby making the overall shaft joystick reasonable in storage. The existing structural space is fully used, which is conductive to transportation and carrying.

The working principle of the present disclosure is roughly as follows:

In this embodiment, buttons on a surface of the body 1 of the shaft joystick include a HOME main menu button, a Turbo serial button, L3 and R3 buttons, a selection button for a pattern corresponding to a model, the LED color selection button 6, a selection return button, the light pattern selection button 5, a selection button for a direction pattern of the lever 2, a Start button, eight game buttons 3, and one lever 2 which are arranged on a front surface of the body 1. In this embodiment, the lever 2 and the eight game buttons 3 are symmetrically arranged in the middle of the body 1. The Start button is arranged at an upper right corner, and the remaining buttons are all arranged on one side of the body 1 far from the user, so as to avoid the impact on the game experience by mistouch of the buttons in an operating process. Specifically, the LED color selection button 6 is a roller, and the remaining buttons are symmetrically distributed on the left and right sides of the LED color selection button 6 which is used as a reference point. The several first LED groups 31 corresponding to the eight game buttons 3 are arranged inside the body 1, and the several second LED groups 21 corresponding to eight operating orientations of the lever 2 are arranged inside the body 1.

When it is necessary to light up and change the color of the LED group of a certain game button 3 or in a certain orientation of the lever 2, a light adjustment operation preset in this embodiment is as follows:

I. The user needs to press the light pattern selection button 5 to enter the light change pattern (in this embodiment, the light change pattern is an always on pattern).

II. The first LED light groups 31 arranged at the positions of all the game buttons 3 are adjusted by:

selecting any game button 3 to be changed, and pressing it all the time; at the same time, pressing the LED color selection button 6 (roller) once to start adjustment; switching the color or on/off of the first LED light group 31 by means of rolling the LED color selection button 6 (roller) back and forth;

when the game button 3 to be changed is switched to a target color or on/off status, releasing the game button 3 to be changed, thus automatically archiving the color or on/off status of the game button 3.

III. The second LED groups 21 arranged in all the orientations of the lever 2 are adjusted by:

selecting an orientation to be changed of the lever 2, and at the same time, pressing the LED color selection button 6 (roller) once to start adjustment; switching the color or on/off of the second LED light group 21 by means of rolling the LED color selection button 6 (roller) back and forth;

when the orientation to be changed of the lever 2 is switched to a target color or on/off status, releasing the lever 2, thus automatically archiving the color or on/off status of the lever 2 in this orientation.

IV. The customized light pattern is reset by:

triggering and making a five-second long press on the LED color selection button 6 while making a long press on the light pattern selection button 5, so as to delete the customized light pattern and restore the factory setting.

In this embodiment, during a light color and on/off adjustment operation, the LED group controller 4 first compares user's button operations with preset operations. When there is a matching operation, the LED group controller 4 sends a control signal to control the first LED groups 31 and the second LED groups 21 to be correspondingly adjusted.

The contents of the present disclosure that are not described in detail can all adopt the prior art, and will not be repeated.

The above is only used to explain the technical solution of the present disclosure, but not to limit the technical solution. Other modifications or equivalent substitutions made by those of ordinary skill in the art to the technical solution of the present disclosure shall fall within the scope of the claims of the present disclosure without departing from the spirit and scope of the technical solution of the present disclosure.

What is claimed is:

1. A shaft joystick with a light adjustment customization function, comprising a body (1), a lever (2) and several game buttons (3), wherein several first Light-Emitting Diode (LED) groups (31), several second LED groups (21) and an LED group controller (4) are arranged inside the body (1); an outer surface of the body (1) is provided with a light pattern selection button (5) and an LED color selection button (6) which are connected to the LED group controller (4);

the first LED groups (31) corresponding to positions of the game buttons (3) are arranged inside the body (1) and are triggered by the game buttons (3); and the second LED groups (21) corresponding to at least four orientations of the lever (2) are arranged inside the body (1) and are triggered by the lever (2) executing the orientations;

the light pattern selection button (5) is used for switching the first LED groups (31) and the second LED groups (21) to a light change pattern; and the LED color selection button (6) is used for adjusting in a customizable manner the colors and on/off of the several first LED groups (31) and the several second LED groups (21) in the light change pattern;

wherein one end of the lever (2) is detachably assembled in the body (1) through the bolt (7); and an unlocking end of the body (1) close to the bolt (7) is movably provided with an unlocking hole cap (8) for locking or unlocking the bolt (7).

2. The shaft joystick with the light adjustment customization function according to claim 1, wherein the light pattern selection button (5) is also used for switching the first LED groups (31) and the second LED groups (21) to any one of a weak light pattern, a strong light pattern, a breathing LED pattern, a marquee pattern and at least one customized light pattern.

3. The shaft joystick with the light adjustment customization function according to claim 1, wherein the LED color selection button (6) and the light pattern selection button (5)

are both arranged on one side of the body (1) far from a user, and the LED color selection button (6) is an adjustment roller.

4. The shaft joystick with the light adjustment customization function according to claim 1, wherein a power-off memorization module electrically connected to the light pattern selection button (5) is arranged in the body (1).

5. The shaft joystick with the light adjustment customization function according to claim 1, wherein the light pattern selection button (5) and the LED color selection button (6) are simultaneously triggered to reset the current customized light pattern.

6. The shaft joystick with the light adjustment customization function according to claim 1, wherein the unlocking hole cap (8) comprises a rotary hole cap piece (81) and a hardware unlocking member (82);

a mounting slot (83) is formed in an unlocking end of the body (1) close to the bolt (7); at least one open position (84) for picking and placing the unlocking hole cap (8) and one close position (85) for preventing the unlocking hole cap (8) from falling off are arranged on the mounting slot (83).

7. The shaft joystick with the light adjustment customization function according to claim 1, wherein a storage cavity (9) is arranged on one side of the body (1); and the storage cavity (9) is used for storing a USB data wire and/or the lever (2).

8. The shaft joystick with the light adjustment customization function according to claim 1, wherein the first LED groups (31) and the second LED groups (21) both comprise at least one kind of red-light diodes HR, green-light diodes HG, blue-light diodes HB and white-light diodes HB.

9. The shaft joystick with the light adjustment customization function according to claim 1, wherein the LED color selection button (6) is an adjustment roller.

* * * * *